United States Patent
Knox

[19]

[11] Patent Number: 6,101,283

[45] Date of Patent: Aug. 8, 2000

[54] SHOW-THROUGH CORRECTION FOR TWO-SIDED, MULTI-PAGE DOCUMENTS

[75] Inventor: Keith T. Knox, Rochester, N.Y.

[73] Assignee: Xerox Corporation, Stamford, Conn.

[21] Appl. No.: 09/103,776

[22] Filed: Jun. 24, 1998

[51] Int. Cl.[7] .............................. G06T 5/00; H04N 1/409
[52] U.S. Cl. ........................ 382/254; 382/275; 358/463; 358/464
[58] Field of Search ................................... 358/401, 448, 358/464, 300, 296, 486, 474, 494, 471, 488, 496, 463; 382/275, 254; 399/362, 363, 364, 14, 306; 355/23, 24, 25

[56] References Cited

U.S. PATENT DOCUMENTS

| | | | |
|---|---|---|---|
| 4,673,285 | 6/1987 | Shogren | 355/23 |
| 4,734,742 | 3/1988 | Klumpp et al. | 355/23 |
| 4,743,974 | 5/1988 | Lockwood . | |
| 4,967,233 | 10/1990 | Buchar et al. . | |
| 5,412,485 | 5/1995 | Kashiwagi | 358/441 |
| 5,646,744 | 7/1997 | Knox | 358/401 |
| 5,666,208 | 9/1997 | Farrell et al. | 358/296 |
| 5,712,485 | 1/1998 | Stolfo | 382/232 |
| 5,832,137 | 11/1998 | Knox | 382/275 |
| 5,973,792 | 10/1999 | Matsuda | 358/448 |

*Primary Examiner*—Scott Rogers
*Assistant Examiner*—Joel S. Shaughnessy

[57] ABSTRACT

An image processing method and system for mitigating the effects of show-through in scanning multiple two-sided documents during book scanning applications in a scanning system. With the disclosed system and method: a scanned first side image P is derived from a first side image A of a duplexed document and a scanned second side image Q is derived from a second side image B of the duplexed document, where at least first side image P includes a component attributable to show-through from said second side of said document, and storing images P and Q; a scanned first side image R is then derived from a first side image C of a subsequent duplexed document and a scanned second side image S is derived from a second side image D of said subsequent duplexed document, and at least the first side image R included a component attributable to show-through from the second side of the subsequent document. Images R and S are stored, and from second side image Q, first side image R, and second side image S, a comprehensive representation is generated thereof corresponding to the show-through contribution of Q, R and S to first side image P. Image P is processed to remove show-through as a function of the representation Q, R and S, thereby deriving correct image A.

18 Claims, 12 Drawing Sheets

SHOW-THROUGH CORRECTION FOR TWO-SIDED, MULTI-PAGE DOCUMENTS

FIELD OF THE INVENTION

The present invention is directed to the reduction or removal of image defects attributable to show-through in two-sided, multiple page image scanning process.

BACKGROUND OF THE INVENTION

Acquisition of information adaptable for electronic processing applications directly from printed original documents has become greatly desirable as an adjunct to electronic document production. An important reason for its desirability is the subsequent capability of manipulation of the electronically stored information for editing, compiling and using the information in forms other than that in which it was originally available. Accordingly, it is desirable to have an image information input capability for such information. In addition to the production of new documents from electronically stored information, it will also be appreciated that some copying functions available in light lens-type copiers, copying images directly from original documents, may be more readily accomplished if image information is available electronically. Thus, with the capability of electronic input of information, coupled with available output devices, functions such as duplex copying, image rotation, cropping, editing, etc., are possible without the requirement of difficult mechanical manipulation of originals and copies.

In duplex scanning, the scan of one side of a typical two-sided piece of translucent paper will contain information from both sides of the page. The high contrast information of the front side will be combined with a low contrast version of the image from the back side of the page. This low contrast information from the back side of the page is called "show-through". In simplex scanning operations where, for example, multiple two-sided pages of a book are being scanned for storage during archiving applications or for duplication, the text of subsequent pages may also "show through" the original target page together with the back side of this original. Thus, layers of show through text or noise interfere with a clean transfer of information such as text from the first page being scanned.

One method for mechanically reducing show-through is to place a black page on the back side of the page while scanning. The light that goes through the page is absorbed by the black backing and, although there is a significant reduction of the show-through by this method, there is a small residual low contrast image of the back side remaining in the scanned image due to light scattering off the back side of the paper. Also, this process requires further user effort therefore becoming a burden to the user.

There are circumstances for which it is not possible to mechanically remove show-through. One is when both sides of the page are scanned simultaneously. In this case, both sides of the page are illuminated and imaged at the same time. Under these conditions, the information on each side will show through to the opposite side. Another circumstance is when a post-scanning correction for show-through is needed for an image scanned on a scanner with a white cover.

The problem of show-through has sometimes been addressed mechanically, as in U.S. Pat. No. 4,743,974 to Lockwood, which shows simultaneous duplex scanning of duplexed documents, with sensors that are slightly offset. The close placement of sensors for simultaneous duplex scanning is desirable for space consideration reasons.

With only the scanned image from one side, there is no way of distinguishing between the low contrast "show-through" information from the back side and the low contrast information from the front side of the page. Additional information is needed to be able to distinguish between the two types of low contrast information. References described herein are hereby incorporated by reference for their teachings.

SUMMARY OF THE INVENTION

In accordance with the invention, an image processing method is described in which a document is processed for the removal of second side and multiple page show-through found in single page documents or during book scanning application involving multiple pages, respectively, for a resulting improvement of original page image appearance.

With only the scanned image from one side, there is no way of distinguishing between the low contrast "show-through" information from the back side of the same document, or the show-through effect of additional pages behind the first side in a book scanning application, and the low contrast information from the front side of the page. Additional information is needed to be able to distinguish between the two types of low contrast information. By scanning both sides of the page and subsequent pages that may have an effect on the target page (or page of interest), it is possible to obtain the extra information needed to mitigate show-through effects. Thus, show-through can be substantially reduced by removing image components in the scanned image attributable to show-through, by 1) knowing the image content of both first, second and subsequent sides of a multi-page document, 2) knowing the relative alignment of the first, second and subsequent side image content, and 3) identifying low contrast image portions in the scanned image attributable only to second and subsequent side image content. Thus, images can be automatically cleaned of show-through with minimal operator intervention, and minimal image impact.

In accordance with an aspect of the present invention, the show through attributable to visible text or background from subsequent pages are obtained during book scanning applications through an extension of the duplex procedure mentioned in the co-pending, parent application briefly described in the detailed description. Book scanning occurs in the simplex scanning mode where a book containing many pages having text on both sides of the pages is placed over the platen on a scanner. The document processing system for this application is capable of identifying the order and orientation of scanned pages wherein each page image is stored in a memory location together with data on its orientation and order. The stored information for each page is used by the system, prior to final document storage (archiving) or rendering, to subtract the effects of show through for each respective page.

DESCRIPTION OF THE DRAWINGS

These and other aspects of the invention will become apparent from the following descriptions to illustrate a preferred embodiment of the invention read in conjunction with the accompanying drawings in which.

DETAILED DESCRIPTION OF THE INVENTION

Figure 1:
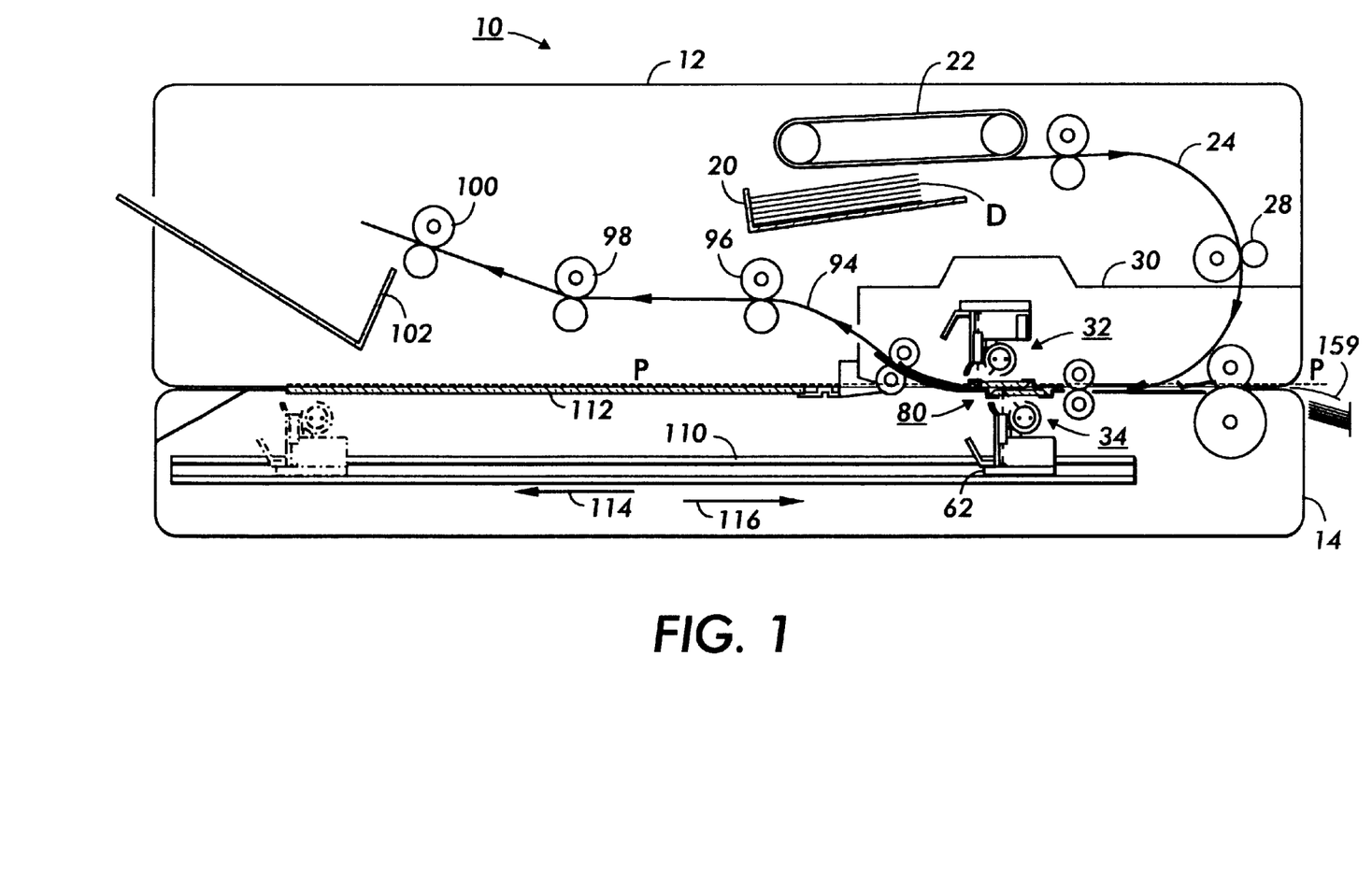
FIG. 1 shows a duplex scanner.

Referring now to the drawings where the showings are for the purpose of illustrating a duplex scanning system implementing the show-through correction process described in the parent application, FIG. 1 shows a raster input scanner 10 for generating an electronic representation of an image on a document. At this point of the description we are primarily concerned with providing a background description of "duplex" documents, i.e., original documents with images on both faces thereof. "Image" as used herein refers to the information on the document, for which scanning is desired, and which will be in some manner copied to another substrate or to an electronic storage medium. "Scanning" as used hereinafter, refers to the relative movement of photosensitive sensors with respect to documents for the purpose of acquiring an electronic representation of the image or information about the image.

Reference is made to U.S. Pat. No. 4,743,974 to Lockwood, and U.S. Pat. No. 4,967,233 to Buchar et al., which describe an example duplex image. Similar problems would be noted in the arrangements described in U.S. Pat. No. 4,673,285 to Shogren, U.S. Pat. No. 4,734,742 to Klumpp et al. Show-through can be a problem in any scanner, simplex or duplex.

During prior duplex scanning, documents D are directed by document feeder 22 to an input sheet path 24 to be directed to a scanning position.

Documents 10 are driven along input sheet path 24 into scanning station 30. Best viewed at FIGS. 2 and 3, and in accordance with the invention, scanning station 30 is comprised of upper and lower scanning elements 32 and 34. Scanning array 38 may be a linear array of photosensitive sensors such as CCD's or photodiodes which are controlled to sense light reflected from a document during an integration period. The photosensitive sensors develop a charge indicative of the amount of light detected, for transmission to an image processor for use in assimilating an electronically stored representation of the image on the document.

Referring again to FIG. 2, lower scanning element 34 is provided as a mirror image of scanning element 32, including a frame 60, scanning array support member 62, scanning array 64, lamp assembly including lamp 66 and lamp cover 68 having aperture 69, lens 70 and frame extension member 72 having a reflective surface 74. The primary difference between the two scanning elements is that the lower scanning element 34 is arranged in a position opposing that of upper scanning element 32, in order to scan images on a side of the document opposite to that scanned by the upper scanning element 34. Accordingly, as viewed in FIGS. 2 and 3, images on the upper face of documents, passing through the scanning station 30 are illuminated and scanned by upper scanning element 32, while images on the lower face of the document are illuminated and scanned by the lower scanning element 34. In practice, it is preferable to have the elements slightly offset from one another so that the illumination provided for scanning one side of the document does not cause shadows detectable by the sensors in the scanning arrays to show-through the documents. However, the problem of show-through still exists.

Figure 2:
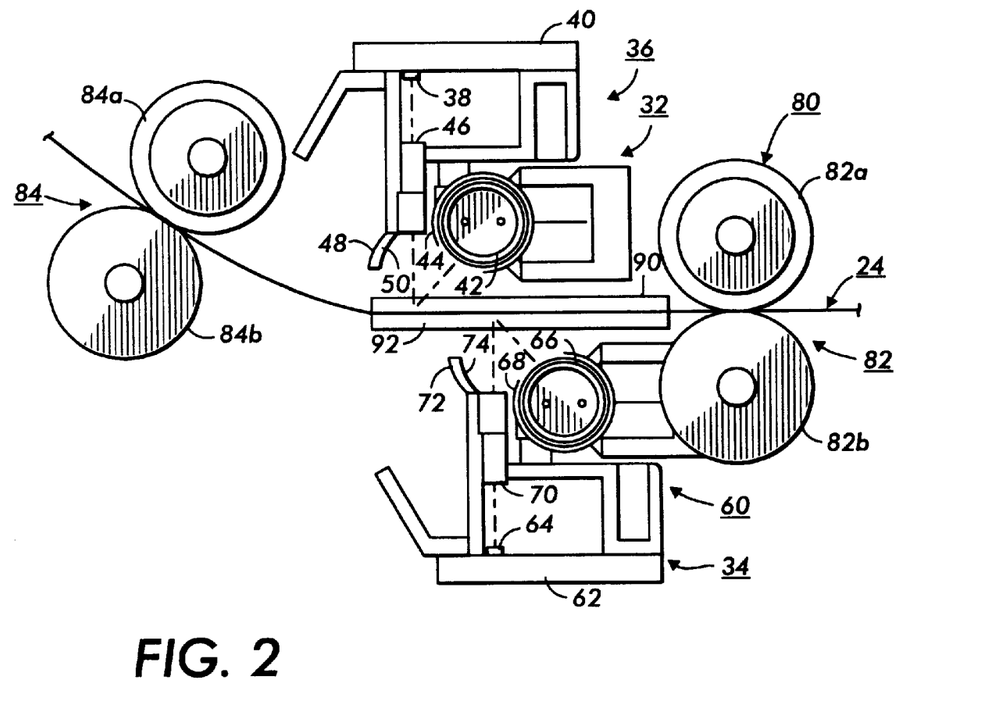
FIGS. 2 and 3 show a duplex scanning assembly.
Figure 3:
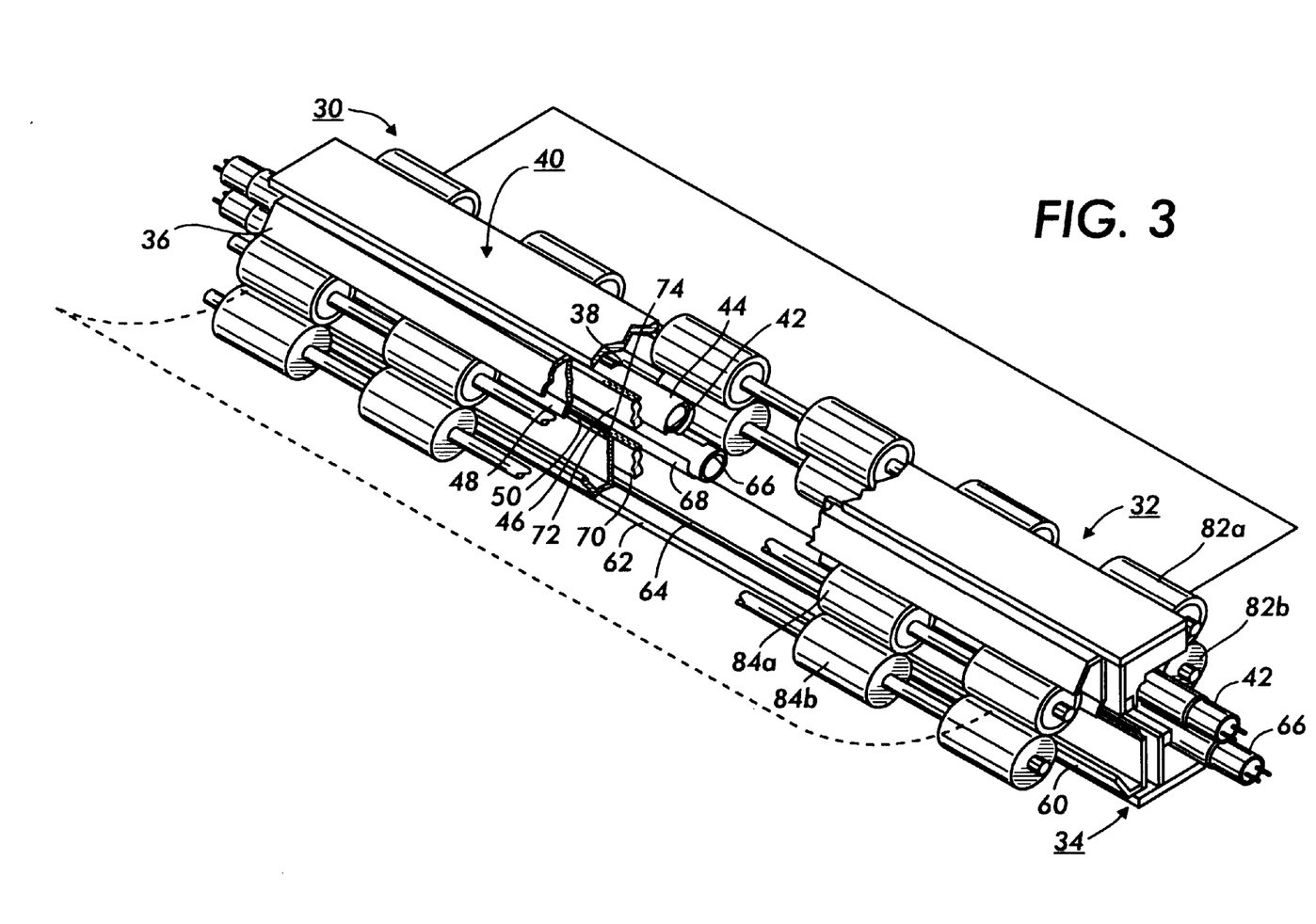

With reference to FIGS. 1 and 2, sheets transported through scanning station 32 are directed between platen glass members 90 and 92. As documents are advanced through scanning station 30, photosensitive sensors on scanning arrays 38 and 64 derive an electronic representation of the image thereon for transmission to an image processing or storage device.

Control of the described duplex arrangement may be accomplished in a variety of ways, depending on the planned usage of the device. Feeding of documents, control of sheets directed through the sheet path operation during the desired modes of operation, including movement of the scanning element 34 in its scanning motion across the platen may be controlled by an on-board microprocessor of the type commonly used in the control of light lens copiers, or prior raster scanners and tailored to the application required by the present device. Control of the imaging assembly may also be an on-board microprocessor device which repeatedly polls the sensors of sensor arrays 38 and 64 to derive charge information indicative of the image on documents scanned thereby, assigns the derived data with address information and provides the addressed information as an output. The control of the device is responsive to operator information input. Alternatively, the described device may be partially or completely controlled by another device, such as for example, a computer, a local or remote workstation or compatible printer.

Figure 4:
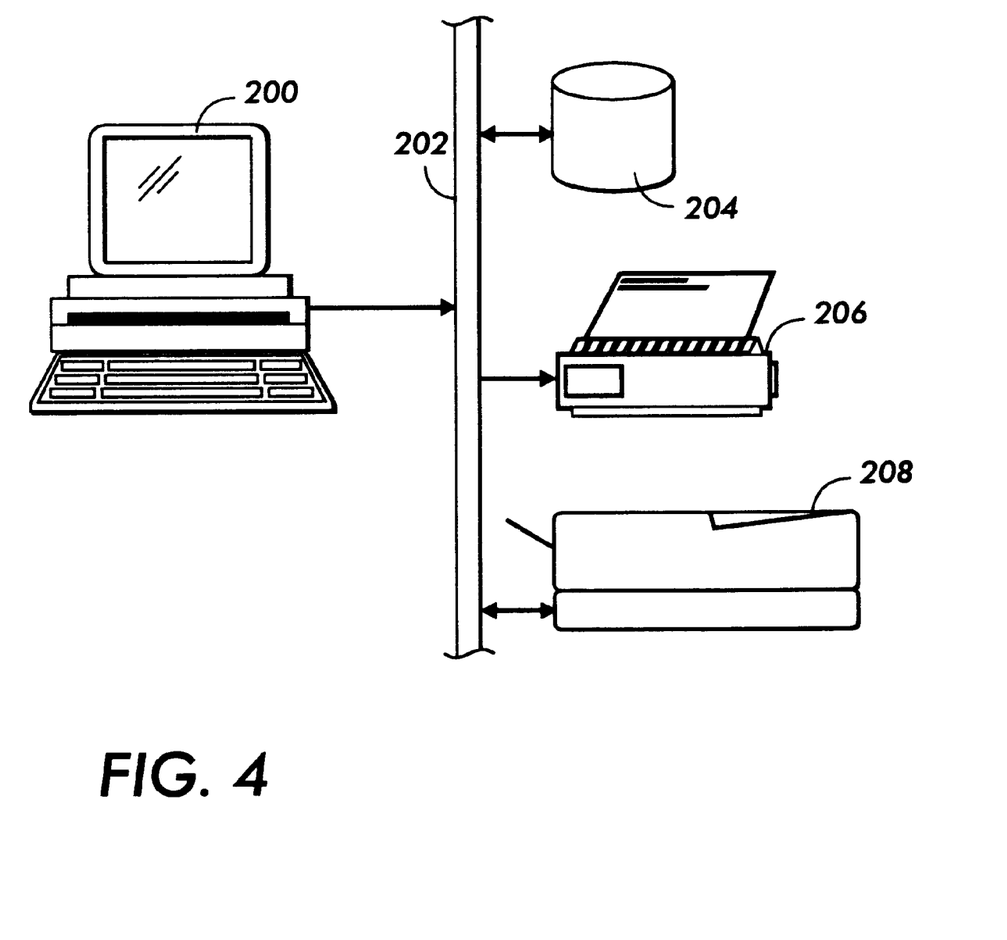
FIG. 4 shows a document processing system in which the present invention can be implemented.

FIG. 4 shows a computer workstation 200, connected via a network connection 202 to a text and graphics document storage device 204. The inventive processing steps that will be described herein may take place either on the workstation, or at a server or processor associated with storage device 204. The computer workstation may be associated with a printing system 206 for reproduction of documents in hard copy. The computer workstation may also be associated with the scanning system 208. As another alternative, the processing described may take place within the scanner itself, if the scanner is equipped with the appropriate processors. This may well be the case in the situation of a digital copier, which is equivalent to the computer/scanner/printer combination described herein.

Figure 5:
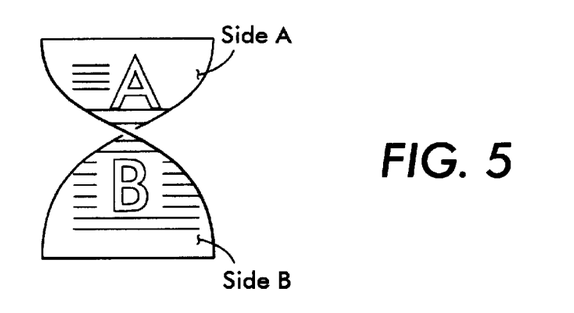
FIGS. 5–9 show a step-by-step illustration of the image as the invention operates on it.

With reference now to FIGS. 5–9, a step by step process describing the original two sided show-through problem addressed by the inventor in the parent patent is provided. FIG. 5 illustrates a two sided document which may have show-through defects.

Figure 6:
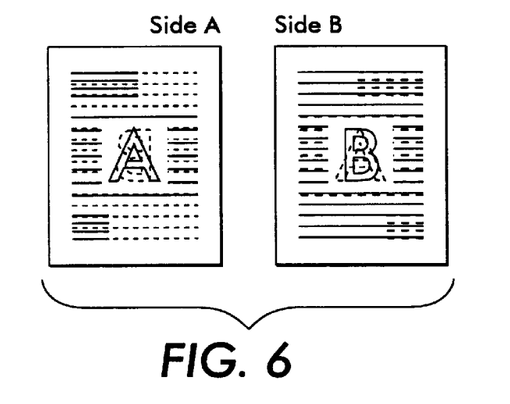

FIG. 6 illustrates the results of scanning the document. With only the scanned image from one side, there would be no way of distinguishing between the low contrast "show-through" information from the back side and the low contrast information from the front side of the page. Additional information is needed to be able to distinguish between the two types of low contrast information. By scanning both sides of the page, it is possible to obtain the extra information needed.

In accordance with the invention, once both sides of an image have been acquired, show-through mitigation may occur. Another arrangement might include a high quality sensor array and a low quality sensor array, where information from the low quality sensor array is used for acquiring the second side image.

Figure 7:
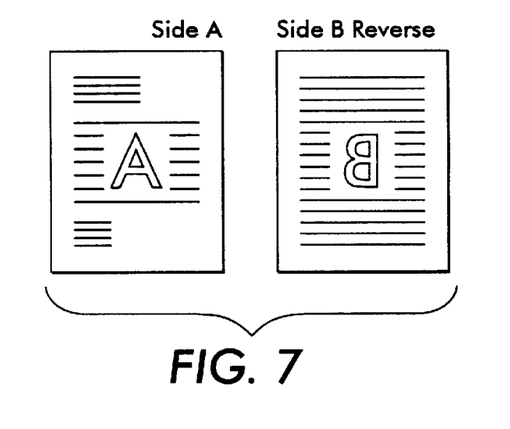

With reference now to FIG. 7, in performing a show-through mitigation, it is important to notice is that the low contrast show-through information will be reversed, left-toright, from the high contrast information of the other side. Therefore, when comparing the high contrast and low contrast information from the two sides, it is necessary to reverse one of the images.

Figure 8:
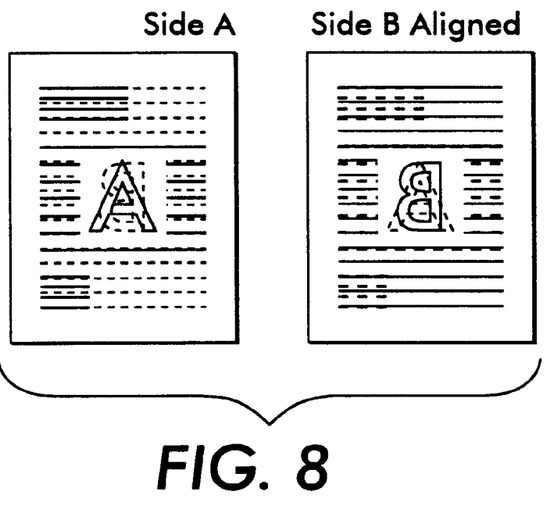

With reference to FIG. 8, the next requirement is to align the high contrast and low contrast images. Because the images are acquired at different times, or at different sensors, they are not scanned with the same spatial reference. Skew alignment, lateral shifts and linear distortions of the image all may be required. For the simultaneous scan case, these corrections can be determined from the geometry of the scanner, or by a calibration process, which scans a test target, and notes the spatial displacement of target features. For the case of a software correction of an arbitrary scanner output, some human guidance to the correction algorithm may be required.

At this point in the process, a pixel location on side A can be identified as potentially having a contribution to its value from side B, due to knowledge of the location of the image on side B.

Figure 9:
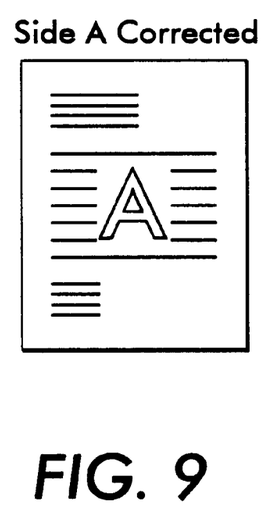

Accordingly, as illustrated in FIG. 9, it is desired that low contrast information (Side B) will be removed from areas of a first image (Side A), corresponding to show-through from the second image. Initially it is noted that the show-through image is relatively low contrast in nature, mixed in with a high contrast main image. An example document has two sides, A and B. After 1) reverse reading the image into a buffer, and 2) aligning each image, the document has been processed so that each pixel location on side A or B corresponds to the both the front side or correct image A or B, and the show-through reversed image B or A, respectively. In this condition, the document is ready for show through mitigation.

Models are available which describe the resulting image: the resulting scanned images P and Q might be expressed as:

$$P(x)=(A(x)+fB(-x))/(1+f) \quad (1)$$

$$Q=(fA(-x)+B(x))/(1+f) \quad (2)$$

where f is a constant describing the contrast level of the show-through portion of the image.

The true images, A and B, are therefore given by:

$$A(x)=(P(x)-fQ(-x))/(1-f) \quad (3)$$

$$B(x)=(Q(x)-fP(-x))/(1-f) \quad (4)$$

Accordingly, each pixel in A or B can be modified appropriately, to derive corrected side A or B with minimal impact on the image A or B respectively.

This correction uses a linear model. Other embodiments of the mixing model are possible. For example, the model could include a blur function on the information from the back side. The model could also include non-linear combinations of the two images. In such cases, the correction formulae, in equations 3 and 4, would be different from those shown here.

In practice, each pixel in scanned image P or Q is then modified through a logic arrangement implementing equations 3 and 4 to derive a true image, A or B, respectively.

Figure 10:
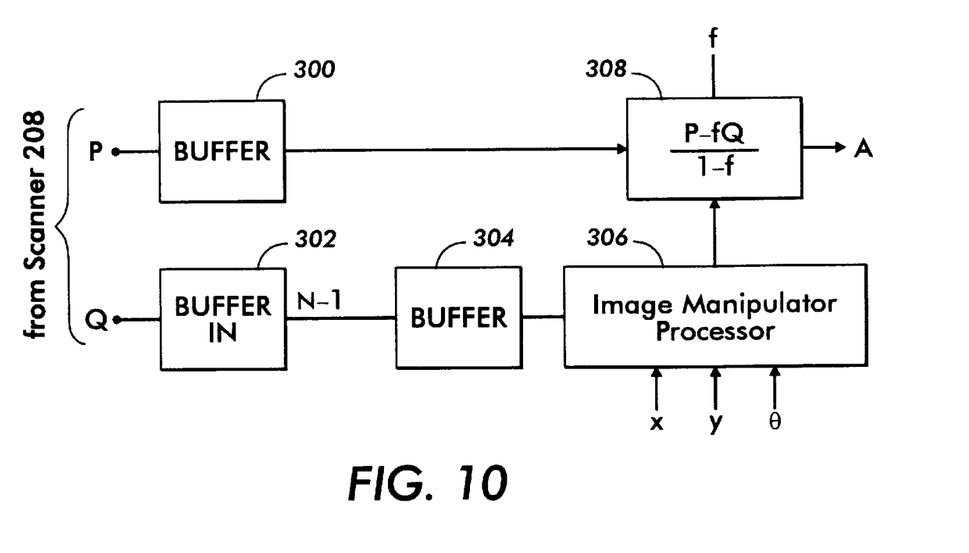
FIGS. 10 and 11 are functional block diagrams of a system implementing one aspect of invention.
Figure 11:
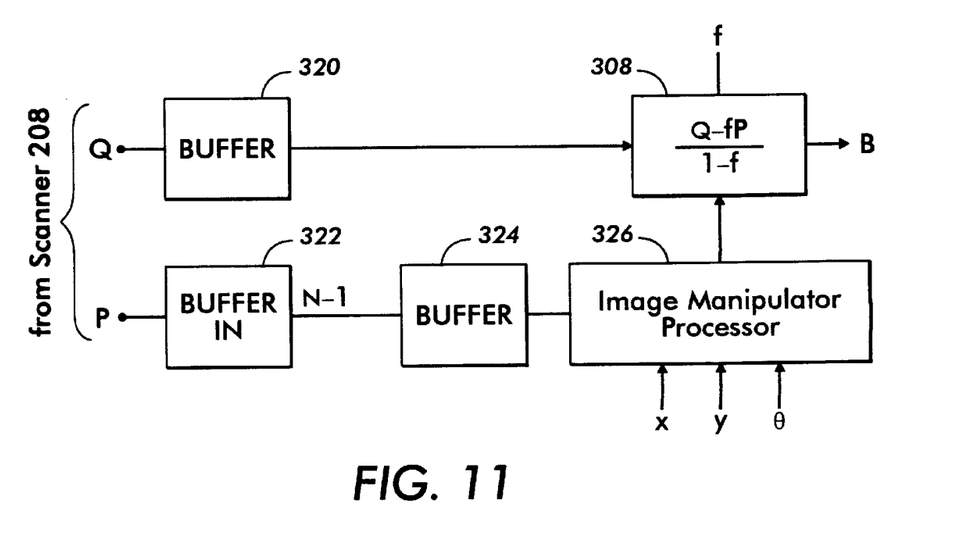

FIGS. 10 and 11 illustrate a functional block diagram showing one possible embodiment of the process described. Referring initially to FIG. 10, initially, scanned images P (which is the scanned combination of the side A image and the show-through contribution of side B) and scanned image Q (the scanned combination of the side B image, and the show-through contribution of side A, which for mitigation purposes is considered minimal) are scanned and buffered at memory device 300 and 302 respectively. Data describing scanned image Q is initially stored at buffer 302 in a standard 1–N format. It is however, rewritten to buffer 304 in an N–1 format, to reverse read the image. Next, the scanned image Q data is translated to accomplish spatial correction at image manipulation processor 306 by an amount determined in a calibration process, in terms of x, y and θ position, so that each pixel of scanned image Q approximately correspond to the position of its effect on scanned image P. The reverse read and aligned image is subsequently processed in accordance with equation 3, to remove from scanned image P a component of the image attributable to show-through.

FIG. 11 is substantially similar to FIG. 10, with buffer 320 receiving scanned image Q, buffer 322 receiving scanned image P, buffer 324 receiving the reverse read version of scanned image P, and image manipulation processor 326 spatially translating scanned image P by an amount required to bring it into alignment with scanned image Q. Equation 4 is applied to scanned images P and Q for the derivation of true image B from derived scanned images P and Q.

The described equations can be applied to each pixel either by circuitry or software programmed for accomplishing the mathematical calculation, or more likely, with a look-up table, loaded with likely corrections for a given set of materials and conditions.

The calibration used at image manipulation processors 306, 326 can be either entered by a user on an image by image basis, or derived an inserted automatically with a calibration process that scans a test target and locates a target feature with respect to each scanning position. Likewise, a value of the show-through coefficient f can be entered on a trial and error basis with a user observing the results or by measuring show-through based on known imaging parameters.

Different types of paper will have different amounts of show-through. The type of marking, i.e. toner, ink, pen, etc., may also influence the amount of show-through. These different values will not be radically different for normal plain paper. If necessary, a manual adjustment to the amount of show-through correction, i.e. the value of "f", could be provided to allow the operator to maximize the correction.

Figure 12:
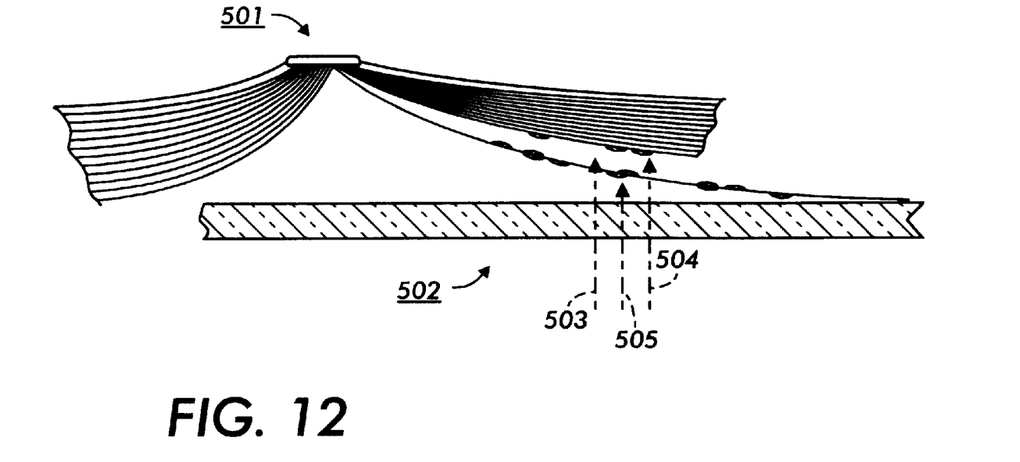
FIGS. 12–17 shows an example of a series of documents is a book scanning operation.

The rest of this description is directed to the problem of multiple page show through as encountered during scanning operations involving multi-page documents that are bound such as a book. FIGS. 12–17 provide an illustration of the problem. Referring to FIG. 12, a book 501 placed on a platen 502 of a copier is illustrated. As described in the background, during simplex scanning operations where, for example, multiple two-sided pages of a book are being scanned for storage during archiving applications or for duplication, the text of subsequent pages may also "show through" the original target page together with the back side of this original. Thus, layers of show through text, 503 (backside)/504 (front of subsequent page) or noise interfere with a clean transfer of information such as text from the first page 505 being scanned.

Figure 13:
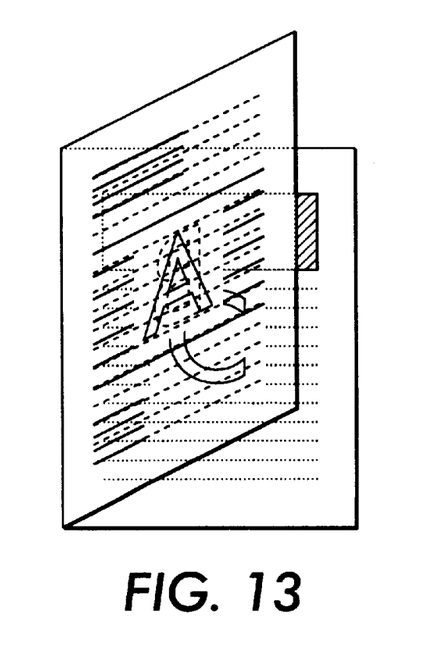
Figure 14:
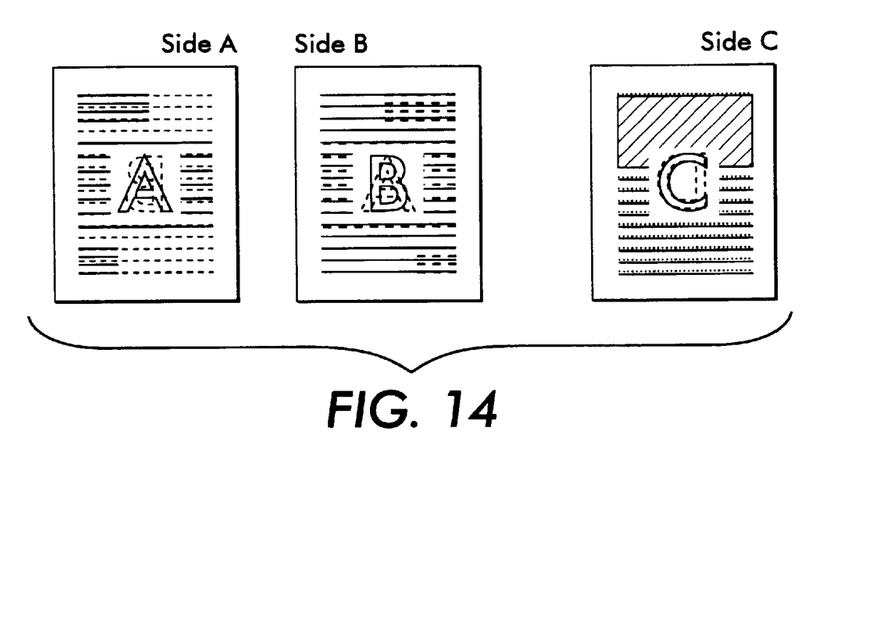
Figure 15:
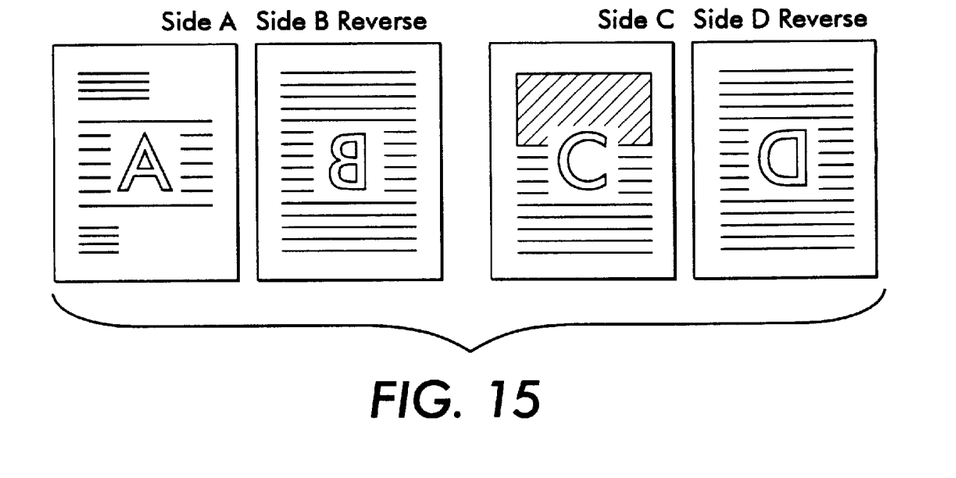
Figure 16:
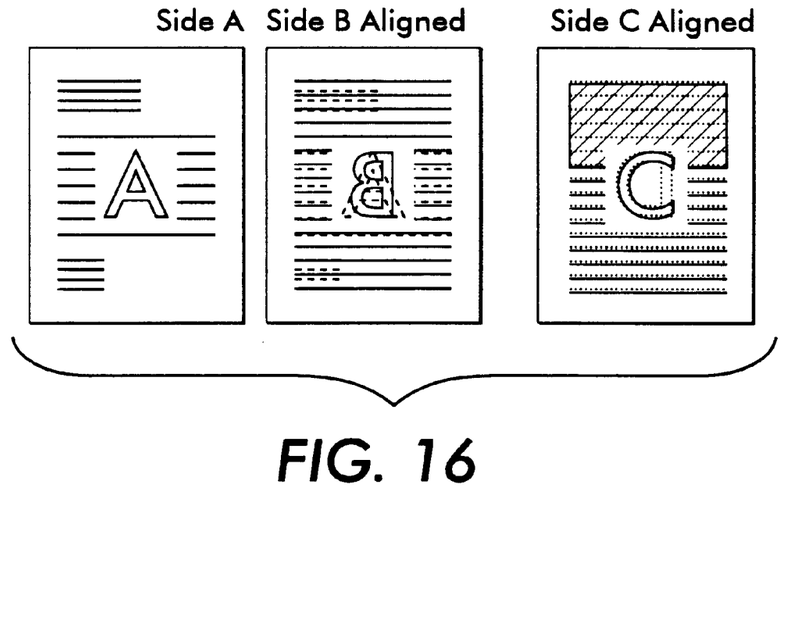

In accordance with the present invention, the show through attributable to visible text or background from subsequent pages are obtained during book scanning applications through an extension of the duplex procedure mentioned above and in the co-pending, parent application briefly described in the detailed description. Referring to FIG. 13, book scanning occurs in the simplex scanning mode where a book containing many pages having text on both sides of the pages is placed over the platen on a scanner.

Figure 17:
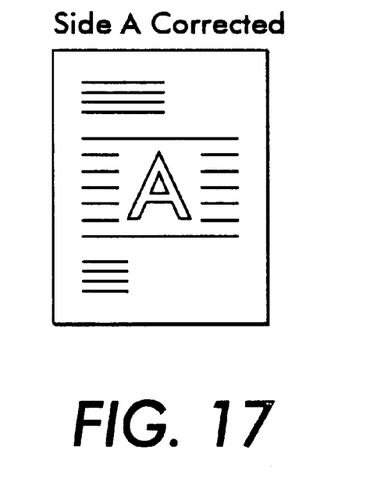

Assuming a first page A is the desired page to be photocopied from a book, subsequent pages, illustrated as B, C and D may have a show-through affect on the image of page A. In order to obtain a clean copy of target page A as shown in FIG. 17, the reverse effects of page B and possibly D, and the natural affect of page C would have to be accounted for and removed from the higher contrast image of page A. These images are provided in FIGS. 14–16.

The processing of multiple pages is an extension of the basic algorithms and components used for a single page document method discussed hereinbefore. The document processing system for the simplex/duplex application is capable, with modification, of identifying the order and orientation of subsequently scanned pages wherein each page image is stored in a buffer (memory location) together with data on its orientation and order. The stored information for each page is used by the system as shown in FIG. 4, prior to final document storage, archiving or rendering, to subtract the effects of show through for each respective page.

With the present image processing method, effects of show through are mitigated in multiple page scanning operations through a modification of the duplex process where: scanned first side image $P_n$ from the first side image $A_n$ of the $n^{th}$ duplexed document, scanned second side image $Q_n$ from a second side image $B_n$ of said $n^{th}$ duplexed document and scanned first side image $P_{n+1}$ from a first side image $A_{n+1}$ of the subsequent $n+1^{th}$ duplexed document are derived, where at least said first side image $P_n$ including a component thereof attributable to show-through from said second side of said $n^{th}$ document and a component thereof attributable to show-through from said first side of said subsequent $n+1^{th}$ document, and storing images $P_n$, $Q_n$ and $P_{n+1}$. From second side image $Q_n$, and first side image $P_{n+1}$, generating a comprehensive representation thereof corresponding to the show-through contribution of $Q_n$ and $P_{n+1}$ to first side image $P_n$. Image $P_n$ is then processed to remove show-through as a function of the representation $Q_n$ and $P_{n+1}$, thereby deriving correct image $A_n$. The representation of $Q_n$ is generated by reverse reading image $Q_n$ and the representation of $Q_n$ and $P_{n+1}$ are generated by translating images $Q_n$ and $P_{n+1}$ in terms of spatial coordinates to bring each pixel of images $Q_n$ and $P_{n+1}$ to a position corresponding to the contribution thereof to image $P_n$. The representation of $Q_n$ is generated by: reverse reading image $Q_n$; and translating image $P_{n+1}$ and reverse read image $Q_n$ in terms of spatial coordinates required to bring each pixel of images $Q_n$ and $P_{n+1}$ to a position corresponding to the contribution thereof to image $P_n$. Image $P_n$ is additionally a function of a show through coefficients f and g, indicating the intensities of the show through portions of the image, corresponding to second side image $B_n$ of the $n^{th}$ duplex document and first side image $P_{n+1}$ of the $n+1^{th}$ duplex document.

Models are available which describe the resulting image from a multiple document scan: the resulting scanned images $P_n$ and $Q_n$ might be expressed as:

$$P_n(x)=(A_n(x)+fB_n(-x)+gA_{n+1}(x))/(1+f+g) \quad (5)$$

$$Q_n(x)=(B_n(x)+fA_n(-x)+gB_{n-1}(x))/(1+f+g) \quad (6)$$

where f is a constant describing the contrast level of the show-through portion of the image from the second side image $B_n$, and g is the constant describing the contrast level of the show-through portion of the image from the first side image $A_{n+1}$. In this multiple document model, the scan of one side includes show-through effects from the second side of the first document and from the first side of the document of the second document, which is in contact with the first document.

In equation (5) the additional image term, $A_{n+1}(x)$, may be modeled as:

$$P(x)=(A_{n+1}(x)+fB_{n+1}(x)+gA_{n+2}(x))/(1+f+g) \quad (7)$$

Solving equation (7) for $A_{n+1}$ and solving equation (6) for $B_n$ and substituting them into equation (5) yields the following equation for $A_n(x)$ $$A_n(x)=(1+f+g)(P_n(x)-fQ_n(-x)-gP_{n+1}(x))/(1-f^2)+O(f^2) \quad (8)$$

where $O(f^2)$ refers to terms that contain $f^2$, or fg, or $f^2g$. These terms are much smaller in magnitude than terms with f or g only and do not influence the calculation for $A_n(x)$ and are therefore not included. The final expression for $A_n(x)$ is:

$$A_n(x)=(1+f+g)(P_n(x)-fQ_n(-x)-gP_{n+1}(x))/(1-f^2) \quad (9)$$

In a similar manner, an expression for $B_n(x)$ can be shown to be:

$$B_n(x)=(1+f+g)(Q_n(x)-fP_n(-x)-gQ_{n-1}(x))/(1-f^2) \quad (10)$$

These two expressions show that to mitigate the effects of show-through during multiple page scanning operations, it is necessary to scan both sides of a duplex page and an additional page, that is either just before or just after the page of interest.

Figure 18:
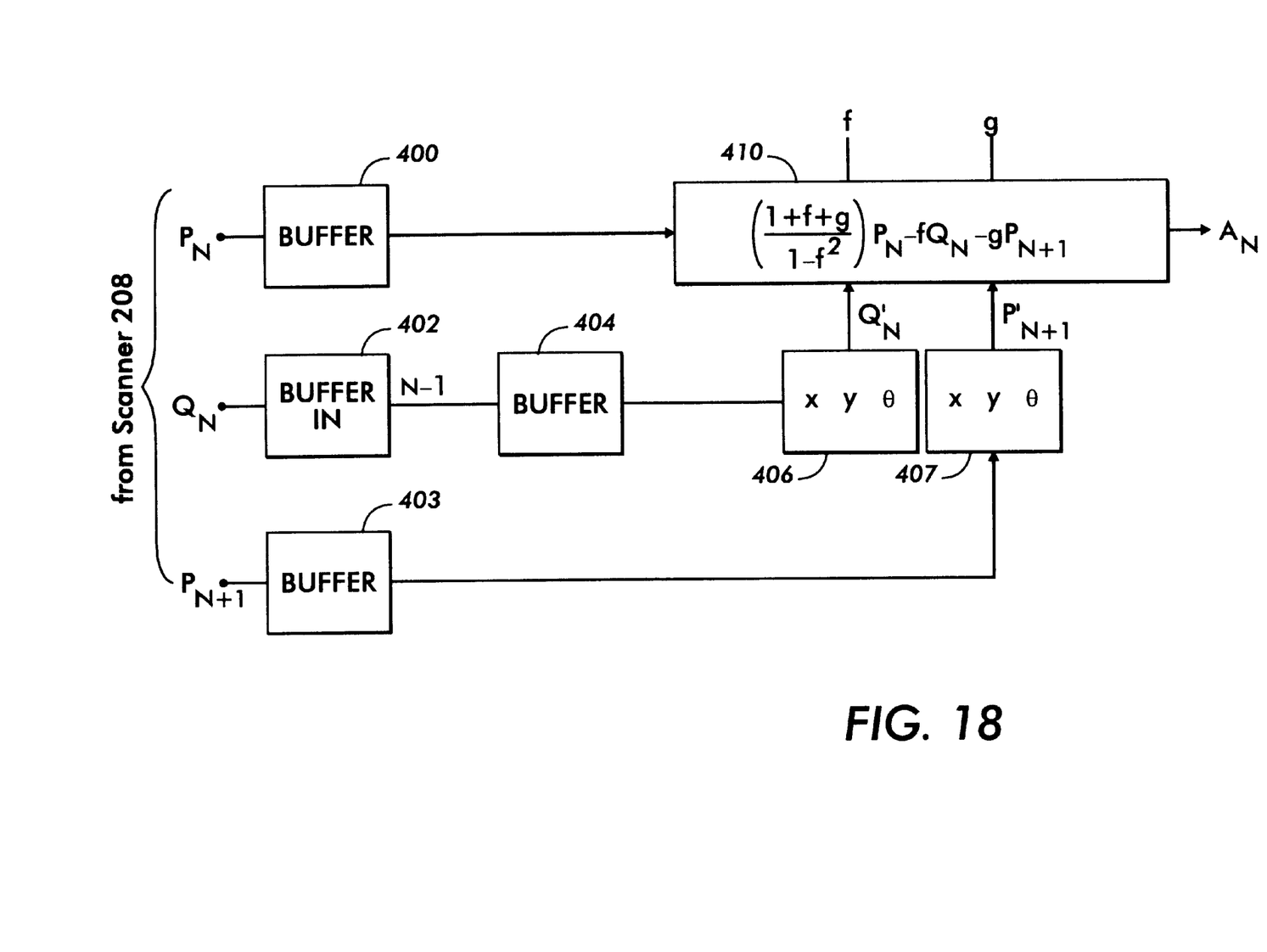
FIGS. 18 and 19 are functional block diagrams of a system for implementing an aspect of the invention for a book-type scanning operation.
Figure 19:
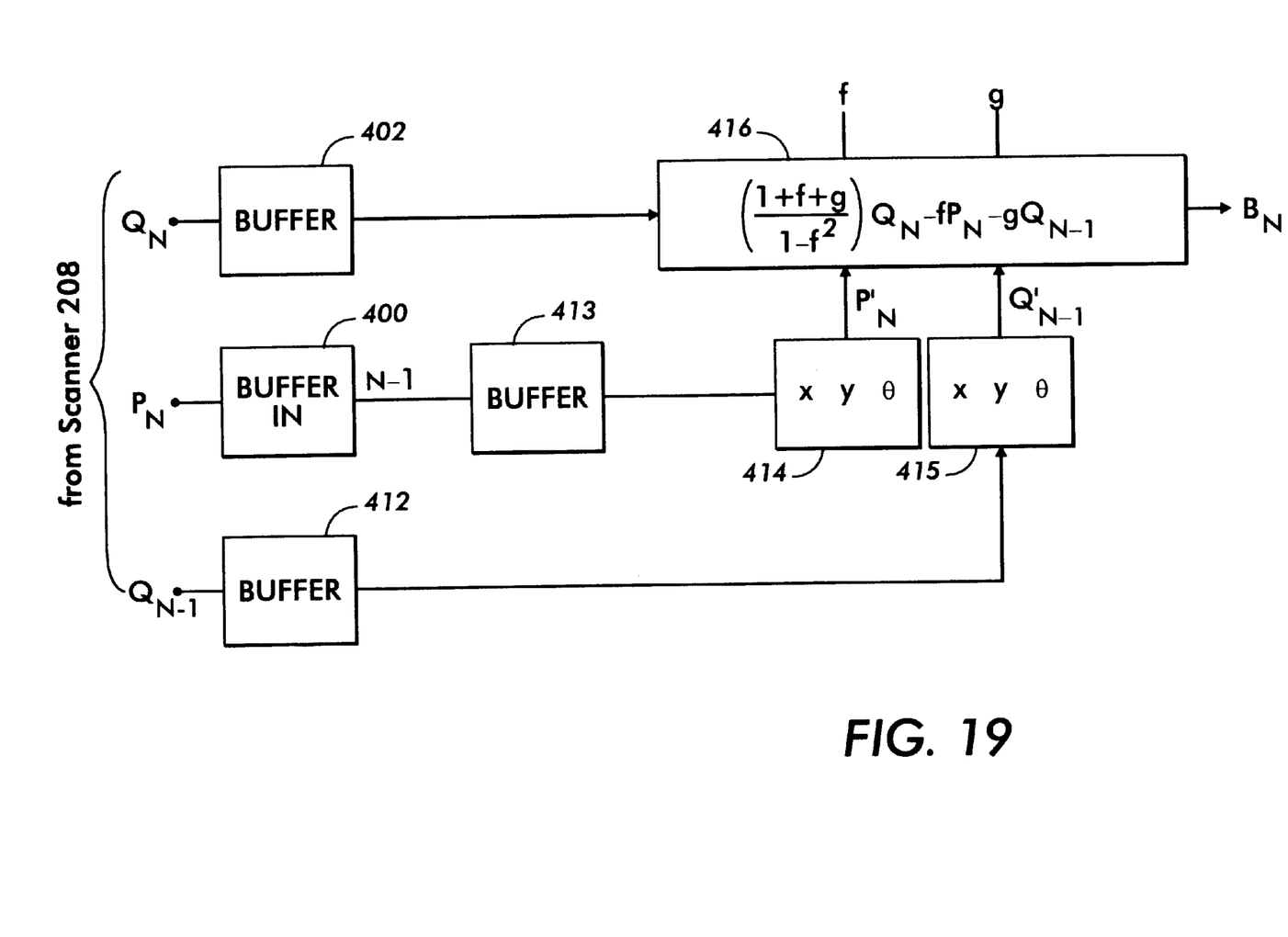

FIGS. 18 and 19 illustrate the block diagrams for a multiple page scanning system. The components are similar in design to the block diagrams of FIGS. 10 and 11, with additional buffers 403 and 412 provided for $P_{N+1}$ and $Q_{N+1}$, respectively. Furthermore, the image processing system for mitigating the effects of show-through during multiple page scanning operations would require components 406, 407 and 410 for $P_{N+1}$, and 416, 414, and 416 for $Q_{N+1}$, necessary for the multiple document algorithms discussed above. The system and method is capable of: deriving a scanned first side image P from a first side image A of a duplexed document and a scanned second side image Q from a second side image B of the duplexed document, at least the first side image P including a component thereof attributable to show-through from the second side of the document, and storing in memory images P and Q; and deriving a scanned first side image R from a first side image C of a subsequent duplexed document and a scanned second side image S from a second side image D of said subsequent duplexed document, at least said first side image R including a component thereof attributable to show-through from said second side of said subsequent document, and buffering images R and S. A buffer is required for storing images Q, R and S, such as separate buffers for each image. An image manipulation circuit will generate a representation of Q, R and S corresponding to the show-through contribution to first side image P, and a processor will process image P to remove show-through as a function of the representation Q, R and S, thereby deriving correct image A. The image manipulation circuit may further comprise a translator means for translating images Q and S in terms of spatial coordinates to bring each pixel of images Q and S to a position corresponding to the contribution thereof to image P.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

What is claimed is:

1. An image processing method for mitigating the effects of show-through in multiple page scanning operations, comprising:

deriving a scanned first side image P from a first side image A of a duplexed document and a scanned second side image Q from a second side image B of said duplexed document, at least said first side image P including a component thereof attributable to show-through from said second side of said document, and storing images P and Q;

deriving a scanned first side image R from a first side image C of a subsequent duplexed document and a scanned second side image S from a second side image D of said subsequent duplexed document, at least the first side image R including a component thereof attributable to show-through from said second side of said subsequent document, and storing images R and S;

from second side image Q, first side image R, and second side image S, generating a comprehensive representation thereof corresponding to the show-through contribution of Q, R and S to first side image P;

processing image P to remove show-through as a function of the representation Q, R and S, thereby deriving correct image A.

2. The image processing method of claim 1, wherein said representation of Q and S is generated by reverse reading image Q and S.

3. The image processing method of claim 1, wherein the representation of Q, R and S are generated by translating images Q, R and S in terms of spatial coordinates to bring each pixel of images Q, R and S to a position corresponding to the contribution thereof to image P.

4. The image processing method of claim 1, wherein the representation of Q and S is generated by:

reverse reading images Q and S;

translating reverse read images Q, R and S in terms of spatial coordinates required to bring each pixel of images Q, R and S to a position corresponding to the contribution thereof to image P.

5. The image processing method described in claim 1, wherein said image P is additionally a function of a show through coefficient f, indicating the intensity of the show through portion of the image.

6. An image processing system for mitigating the effects of show-through during multiple page scanning operations, comprising:

a microprocessor controlled scanner for:

i) deriving a scanned first side image P from a first side image A of a duplexed document and a scanned second side image Q from a second side image B of the duplexed document, at least the first side image P including a component thereof attributable to show-through from the second side of the document, and storing in memory images P and Q; and ii) deriving a scanned first side image R from a first side image C of a subsequent duplexed document and a scanned second side image S from a second side image D of said subsequent duplexed document, at least said first side image R including a component thereof attributable to show-through from said second side of said subsequent document, and storing in memory images R and S;

a memory for storing images Q, R and S;

an image manipulation circuit for generating a representation of Q, R and S corresponding to the show-through contribution to first side image P;

means for processing image P to remove show-through as a function of the representation Q, R and S, thereby deriving correct image A.

7. The image processing arrangement of claim 6, wherein said image manipulation circuit for generating the representation of Q, R and S includes means for reverse reading images Q and S.

8. The image processing system arrangement of claim 6, wherein said image manipulation circuit for generating a representation of Q and S further comprises a means for translating images Q and S in terms of spatial coordinates to bring each pixel of images Q and S to a position corresponding to the contribution thereof to image P.

9. The image processing system of claim 6, wherein the image manipulation circuit for generating a representation of Q and S, further comprises:

means for reverse reading of images Q and S; and means for translating reverse read images Q and S in terms of spatial coordinates required to bring each pixel of image Q and S to a position corresponding to the contribution thereof to image P.

10. The image processing system described in claim 6, wherein means for processing image P additionally takes into account a function of a show through coefficient f, indicating the intensity of the show through portion of the image.

11. An image processing method for mitigating the effects of show-through from bound multiple documents during a multiple document scanning application, comprising:

scanning a first side image A of an initial document to acquire an image P including show-through effects of a second side image B;

scanning the second side image B of said initial document to acquire an image Q including the show-through effects of a first side image A;

scanning a first side image C of a subsequent document to acquire an image R;

scanning the second side image D of said subsequent document to acquire an image S including the show-through effects of said first side image C of said subsequent document;

processing image P for removal of show-through effects, by:

generating a representation of Q and R corresponding to the show-through contribution to first side image P, processing image P to remove show-through as a function of the representation Q, R and S, thereby deriving correct image A.

12. An image processing method for mitigating the effects of show-through in scanned multiple documents during a multiple document scanning application, comprising:

scanning a first side image A of an initial document to acquire an image P including show-through effects of a second side image B;

scanning the second side image B of said primary document to acquire an image Q including the show-through effects of a first side image A;

scanning a first side image C of a subsequent document to acquire an image R including show-through effects of a second side image D of said subsequent document;

scanning the second side image D of said subsequent document to acquire an image S including the show-through effects of said first side image C f said subsequent document;

processing image P for removal of show-through effects, by:
generating a representation of Q, R and S corresponding to the show-through contribution to first side image P,
processing image P to remove show-through as a function of the representation Q, R and S, thereby deriving correct image A;

processing image Q for removal of show-through effects, by:
generating a representation of P corresponding to the show-through contribution to second side image Q,
processing image Q to remove show-through as a function of the representation P, thereby deriving correct image B;

processing image R for removal of show-through effects, by:
generating a representation of R corresponding to the show-through contribution to second side image S,
processing image S to remove show-through as a function of the representation R, thereby deriving correct image C;

processing image S for removal of show-through effects, by:
generating a representation of S corresponding to the show-through contribution to second side image Q, and images Q and P, processing image S to remove show-through as a function of the representation R, Q and P, thereby deriving correct image D.

13. The image processing method of claim 12, wherein the representation of Q and S is generated by reverse reading images Q and S.

14. The image processing method of claim 12, wherein the representation of P and R is generated by reverse reading images P and R.

15. The image processing method of claim 12, wherein the representation of Q and S is generated by translating images Q and S in terms of spatial coordinates to bring each pixel of images Q and S to a position corresponding to the contribution thereof to images P and R.

16. The image processing method of claim 12, wherein the representation of P and R is generated by translating images P and R in terms of spatial coordinates to bring each pixel of images P and R to a position corresponding to the contribution thereof to images Q and S.

17. The image processing method of claim 12, wherein the representation of Q and S is generated by:
reverse reading images Q and S;
translating reverse read images Q and S in terms of spatial coordinates required to bring each pixel of images Q and S to a position corresponding to the contribution thereof to images P or R.

18. The image processing method of claim 12, wherein the representation of P and R is generated by:
reverse reading images P and R;
translating reverse read images P and R in terms of spatial coordinates required to bring each pixel of images P and R to a position corresponding to the contribution thereof to image Q or S.

* * * * *